Inventor
Jean Jacques Wapler
Stevens, Davis, Miller & Mosher
Attorneys

United States Patent Office 3,274,757
Patented Sept. 27, 1966

3,274,757
COMBINATION GAS TURBINE AND DUST SEPARATOR
Jean Jacques Wapler, Lille, Nord, France, assignor to Societe Anonyme des Etablissements Neu, Lille, Nord, France, a corporation of France
Filed May 11, 1964, Ser. No. 366,399
Claims priority, application France, May 16, 1963, 18,221, Patent 1,390,923
1 Claim. (Cl. 55—238)

Many expansion machines handle hot gases coming from pressure heat units (furnaces, blast furnaces, cracking of gaseous or liquid fuels, etc.) or from pressure combustion chambers.

These expansion machines of the turbine type come within one of the following classes:

Axial
Centripetal or axial centripetal
Centrifugal.

The turbines of the centripetal type are most often preferred when dust-laden gases are concerned, for they are usually provided before the turbine wheel with a device causing the air to whirl. Now this very whirling entails a separation of the dust particles due to centrifugal effects, a certain amount of the particles avoiding the impeller and being collected in the stator.

The invention combines this aerodynamic device with other aerodynamic devices, the combination thus achieved allowing it to ensure a very effective separation of the dust particles. In addition to the purpose of protecting the turbine wheel by reducing the amount of dust which passes through it, a further advantage is achieved in that the expansion turbine performs the auxiliary function of acting as a dust collector thereby enhancing its economic value since it may be operated with gases containing a relatively high percentage of dust.

Figure 1:
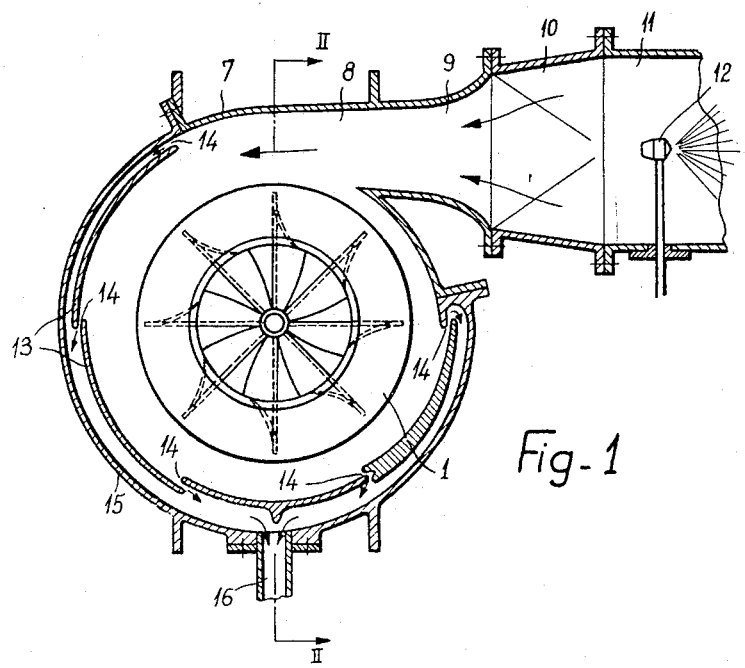
Figure 2:
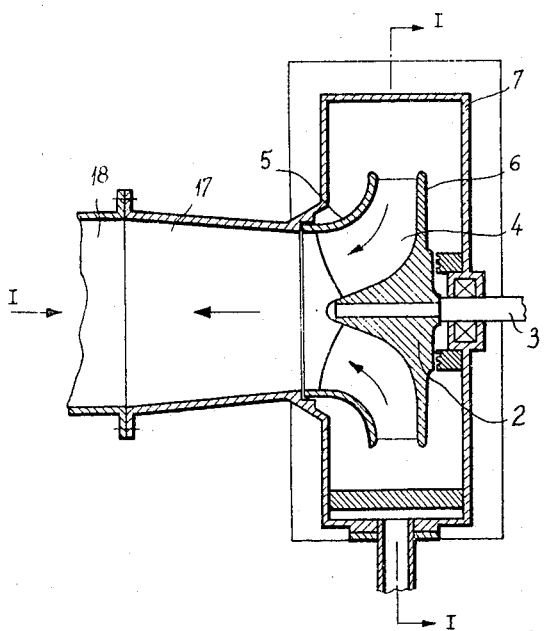

FIG. 1, which is a sectional view perpendicular to the axis of rotation and FIG. 2 which is an axial sectional view show a centripetal turbine of the type which is the subject of the invention: it comprises a centripetal turbine wheel 1 including a hub 2 mounted on a shaft 3. To the hub is fitted a set of blades 4, radial or little inclined on the radius, the spaces between the blades being closed by means of a shroud or shield 5 and of a disc 6 mounted on the hub or forming one-piece with it, the whole being a solid or a welded or riveted composite assembly.

This turbine wheel is enclosed in a volute 7, in other words a scroll-shaped envelope, the gases entering the periphery through a nozzle 8.

Contrary to common practice, the gases are not set to whirling by a series of stationary blades but by the fact that they enter through the aforesaid nozzle tangentially to the volute and purposely far enough from the impeller periphery, the ratio of the mean tangential radius $R_e$ of the flow to the impeller periphery radius $R_p$ ranging approximately between 1.2 and 1.5. This range of ratios is preferable but not essential.

The speed of the gases entering the volute through the nozzle 8 is accelerated by means of an additional arrangement consisting of a convergent passage 9 and of a transition piece 10 with a practically constant or slightly converging section, connecting this nozzle 8 to a piping 11 of a section usually circular and large enough to obtain a fairly moderate flow speed so that the pressure loss in the whole system be not prohibitive. On FIG. 1, the change in section and the convergency between 11 and 8 are represented by two separate elements 9 and 10; however the invention provides that both elements may be made as a unit as well. Within the piping 11 and at a suitable distance from the convergent passage is accommodated at water spraying system 12 that can be set to working to increase the separating effect of the machine.

The gases escape from the impeller 1 in a direction parallel to the axis of rotation and slow down within a diverging element 17 connecting the machine to the piping 18 leading to the system to be supplied with gas. This diverging element 17 is designed with a view to recovering in the best possible way the velocity energy of the gases at the impeller outlet. In particular, though FIG. 2 represents only a simple diverging element designed with a view to recovering the axial velocity flow energy or a very low energy of whirling, the invention provides that it can be replaced by a diverging element designed so as to recover a high velocity energy of whirling. In particular, it can be provided with a guide-vane straightener or given the shape of a volute.

We thus obtain a machine comprising a water spraying system, a converging element for acceleration of the flow speed, a volute creating a vortex, a centripetal turbine. Their successive and combined actions give rise to a effective separation of the dust particles before the entrance to the impeller, the latter being thus protected from erosion and playing perfectly as a consequence its part of recovery of energy.

First of all indeed, the effect of spraying water into the dust-laden gas is to wet the dust, which enlarges the particles and makes their subsequent selection and separation easier.

Moreover immediately atfer the spraying created by the system 12, the converging piece 9 suddenly imparts to the gaseous flow a higher speed; hence an enlargement of the particles as the fine ones that follow approximately the acceleration of the gas flow run into the coarse ones which are less subject to acceleration by reason of their heavier mass. This gives rise to an enlargement of the particles, which effect is used up in the neck of the Venturis adopted in the dust collectors of the wet type.

The gas flow containing wet and enlarged particles enters then the volute at a high speed and, thanks to an effect of whirl accelerating from the orifice 8 to the impeller inlet, the dust particles thus enlarged are submitted to the action of the centrifugal force which expels them at the volute 7 periphery.

To make the discharge of the sludge easier, the volute periphery is made of or covered with plates 13 that can be removable so as to be used as wear plates. These plates are so arranged as to provide between them and the volute 7 peripheral slots 14 the entrance of which is practically normal to the periphery of this volute. Another wall 15 may form if necessary a tight enclosure for the volute. A nozzle 16 collects the sludge.

I claim:

A combination gas turbine and dust separator adapted to be driven by the expansion of dust laden gases, and comprising: a spiral shaped housing, a gas inlet having a convergent portion leading tangentially into said housing, a divergent gas outlet leading axially from said housing, a centripetal type turbine wheel rotatively mounted within said housing coaxially with said gas outlet and immediately adjacent said inlet, said wheel comprising a central hub portion and an outer shield portion, axially extending blades mounted between said hub and shield portions, said blades and said portions providing a centripetal gas passage from outwardly of said wheel into said gas outlet, a spiral shaped plate means mounted between said wheel and the inner wall of said housing and spaced away from said inner wall, dust discharge openings in said plate means circumferentially spaced apart from each other and leading into the space formed between said plate means and said inner wall, an outlet from said space for the dust collected therein; and a liquid atomizing means in said gas outlet in advance of said convergent portion.

References Cited by the Examiner

UNITED STATES PATENTS

| | | | |
|---|---|---|---|
| 816,371 | 3/1906 | Platz | 261—117 |
| 1,866,196 | 7/1932 | Criqui et al. | 55—235 X |
| 2,288,734 | 7/1942 | Noack | 55—315 X |
| 2,361,758 | 10/1944 | DeFligue | 55—315 X |

FOREIGN PATENTS 257,121   8/1926   Great Britain.

ROBERT F. BURNETT, *Primary Examiner.*

D. K. DENEBERG, *Assistant Examiner.*